United States Patent
Allen et al.

(10) Patent No.: US 8,274,881 B2
(45) Date of Patent: Sep. 25, 2012

(54) ALTERING ACCESS TO A FIBRE CHANNEL FABRIC

(75) Inventors: James P. Allen, Austin, TX (US);
Michael P. Cyr, Georgetown, TX (US);
James A. Pafumi, Leander, TX (US);
James B. Partridge, Bastrop, TX (US)

(73) Assignee: International Business Machines Corporation, Armonk, NY (US)

( * ) Notice: Subject to any disclaimer, the term of this patent is extended or adjusted under 35 U.S.C. 154(b) by 412 days.

(21) Appl. No.: 12/464,364

(22) Filed: May 12, 2009

(65) Prior Publication Data
US 2010/0293552 A1    Nov. 18, 2010

(51) Int. Cl.
*G01R 31/08* (2006.01)
*G06F 11/16* (2006.01)

(52) U.S. Cl. ............... 370/216; 370/242; 714/4.11

(58) Field of Classification Search ......... 370/216–219, 370/241, 242, 244, 351, 389; 714/2, 4.1, 714/4.11, 5.1, 5.11
See application file for complete search history.

(56) References Cited

U.S. PATENT DOCUMENTS

| | | | |
|---|---|---|---|
| 6,718,383 B1 * | 4/2004 | Hebert | 709/224 |
| 7,721,150 B2 * | 5/2010 | Belyakov et al. | 714/16 |
| 7,778,157 B1 * | 8/2010 | Tawri et al. | 370/216 |
| 7,783,779 B1 * | 8/2010 | Scales et al. | 709/240 |
| 2003/0140191 A1 | 7/2003 | McGowen et al. | |
| 2006/0130052 A1 | 6/2006 | Allen et al. | |
| 2007/0033366 A1 | 2/2007 | Eisenhauer et al. | |
| 2007/0147267 A1 | 6/2007 | Holland | |
| 2007/0174851 A1 | 7/2007 | Smart | |
| 2008/0201458 A1 | 8/2008 | Salli | |
| 2011/0029973 A1 * | 2/2011 | Hara et al. | 718/1 |

FOREIGN PATENT DOCUMENTS

EP    2 017 711 A2    1/2009

OTHER PUBLICATIONS

"Management Interface for NPIV Support on VIOS", International Business Machines, www.ip.com, IP.com No. IPCOM000171446D, Jun. 10, 2008, 11 pages.
International Search Report and Written Opinion dated Jul. 26, 2010 for International Application No. PCT/EP2010/055001, 12 pages.

* cited by examiner

*Primary Examiner* — Hassan Phillips
*Assistant Examiner* — Saba Tsegaye
(74) *Attorney, Agent, or Firm* — Francis Lammes; Stephen J. Walder, Jr.; Libby Z. Toub (57) ABSTRACT

A mechanism is provided for altering access to a network. A virtual I/O server controller in a virtual I/O server operating system receives an indication that an identified communications adapter requires attention. The virtual I/O server controller issues a set of calls to a set of N_port identification virtualization server adapters coupled to the identified communications adapter. Each of the set of calls indicates to each of the set of N_port identification virtualization server adapters a request to move a set of clients from their assigned port on the identified communications adapter to an available port on a failover communications adapter. The set of N_port identification virtualization server adapters moves the set of clients from the identified communications adapter to the failover communications adapter.

17 Claims, 8 Drawing Sheets

ALTERING ACCESS TO A FIBRE CHANNEL FABRIC

BACKGROUND

The present application relates generally to an improved data processing apparatus and method and more specifically to an apparatus and method for altering access to a Fibre Channel fabric.

N_Port ID virtualization (NPIV) allows single Fibre Channel host bus adapters (HBAs) to register multiple worldwide port names (WWPN) with a fabric name server. A worldwide port name is a unique name in a Fibre Channel network. Each registered worldwide port name is assigned a unique identifier, such as a node port (N_Port) ID, when the worldwide port name connects to a fabric. With N_Port ID virtualization, a single Fibre Channel HBA may appear as multiple worldwide port names in the Fibre Channel fabric. Each NPIV server adapter that provides NPIV, connects to the Fibre Channel network through one or more Fibre Channel host bus adapters (FC HBAs). FC HBAs provide a connection of a host system to other network and storage devices through a Fibre Channel fabric.

SUMMARY

In one illustrative embodiment, a method, in a data processing system, is provided for altering access to a network. The illustrative embodiment receives an indication that an identified communications adapter requires attention. The illustrative embodiment issues a set of calls to a set of N_port identification virtualization server adapters coupled to the identified communications adapter. In the illustrative embodiment, each of the set of calls indicates to each of the set of N_port identification virtualization server adapters a request to move a set of clients from their assigned port on the identified communications adapter to an available port on a failover communications adapter. The illustrative embodiment moves the set of clients from the identified communications adapter to the failover communications adapter.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Many problems arise when maintaining or replacing Fibre Channel host bus adapter (FC HBA) hardware, when moving workload from one FC HBA to another FC HBA, or when moving workload from one port on an FC HBA to another port on the same FC HBA. Known solutions to perform these operations typically require redundant hardware and/or manual intervention from an administrator. Further, to maintain or replace a FC HBA, the administrator requires access to each of the targets for the FC HBAs involved. That is, administrator involvement is required to map worldwide port names (WWPNs) for ports on the FC MBA to target ports that are accessible to the client.

The illustrative embodiments provide a mechanism for using N_port identification virtualization (NPIV) to solve the same problems with minimal hardware and/or administrator involvement. NPIV allows multiple clients to use a physical Fibre Channel port where each client is assigned a unique worldwide port name (WWPN). The illustrative embodiments use a Virtual I/O Server (VIOS) as the controller; however, other types of intermediaries or Virtual Machine Managers (VMMs) may also be used, such as VMware® and Xen™. The VIOS communicates with a plurality of physical Fibre Channel host bus adapters (FC HBAs) through a virtualization layer, which presents virtual FC HBAs using a plurality of worldwide port names. Each client's operating system utilizes a virtual NPIV adapter to connect to one or more ports on the virtual FC HBAs via a NPIV server adapter in the VIOS. The VIOS may forward appropriate fabric events received from the physical FC HBA ports to each client through their virtual NPIV adapter and/or may queue Fibre Channel transactions for each client. The illustrative embodiments use the VIOS to map a client NPIV adapter from an assigned FC MBA port to another FC HBA port in the event of a FC HBA failure, maintenance of an FC HBA, workload balancing between two or more FC HBAs, or the like.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electro-magnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In addition, the program code may be embodied on a computer readable storage medium on the server or the remote computer and downloaded over a network to a computer readable storage medium of the remote computer or the users' computer for storage and/or execution. Moreover, any of the computing systems or data processing systems may store the program code in a computer readable storage medium after having downloaded the program code over a network from a remote computing system or data processing system.

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
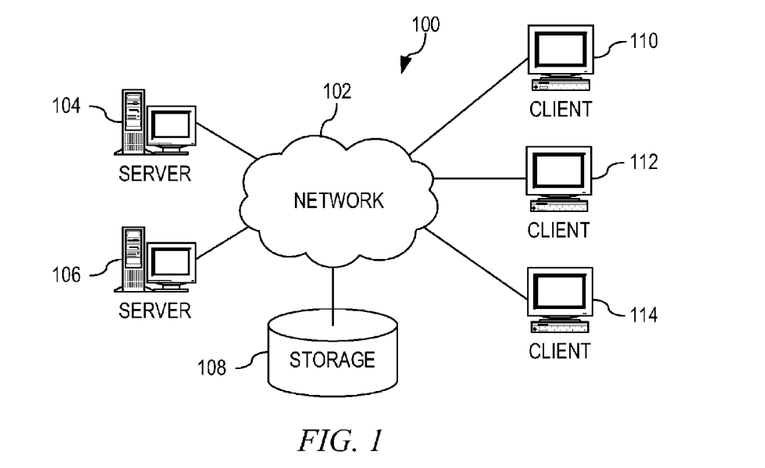
FIG. 1 depicts a pictorial representation of an example distributed data processing system in which aspects of the illustrative embodiments may be implemented.
Figure 2:
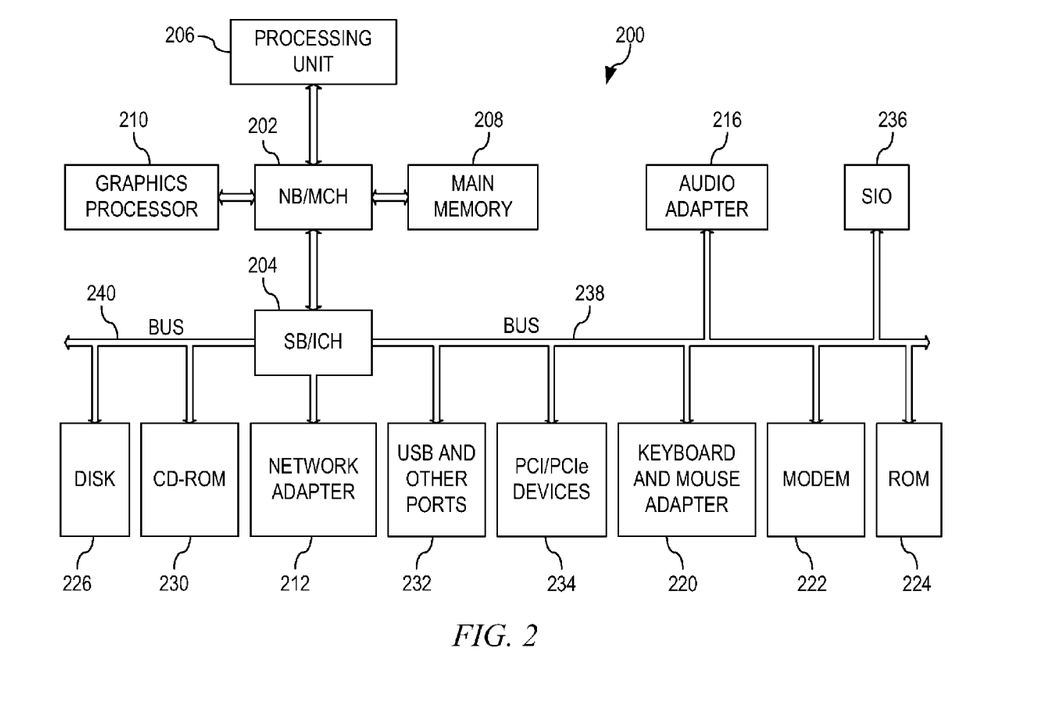
FIG. 2 shows a block diagram of an example data processing system in which aspects of the illustrative embodiments may be implemented.

Thus, the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. While the description following FIGS. 1 and 2 will focus primarily on a single data processing device implementation for altering the access to a Fibre Channel fabric, this is only an example and is not intended to state or imply any limitation with regard to the features of the present invention. To the contrary, the illustrative embodiments are intended to include distributed data processing environments and embodiments in which access to a Fibre Channel fabric may be altered.

With reference now to the figures and in particular with reference to FIGS. 1-2, example diagrams of data processing environments are provided in which illustrative embodiments of the present invention may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an example data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HOD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

Again, the illustrative embodiments provide a mechanism for using N_port identification virtualization (NPIV) to solve the same problems with minimal hardware and or SAN administration. The illustrative embodiments use a Virtual I/O Server (VIOS) that couples to a plurality of physical Fibre Channel host bus adapters (FC HBAs) and presents virtual EC HBAs with their own world wide port name by using a virtualization layer. By forwarding appropriate fabric events received virtual FC HBA ports to each client through their virtual NPIV adapter and/or queuing Fibre Channel transactions for each client or initiator, the VIOS provides for multiple initiators to share one FC HBA so that two FC HBAs may provide redundancy to more then one initiator, thus saving hardware. The illustrative embodiments break dependency between the PC HBA world wide port name and the initiators access to SCSI targets since the world wide port names are attributes of a VIOS controlled NPIV adapter rather then the physical FC HBA. The VIOS provides for sending each effected client a notification of LINK down when the FC HBA to which the client is connected has lost or is losing connectivity to the Fibre Channel fabric or when an expected maintenance event occurs, which require remapping the virtual port of the NPIV adapter to a new physical port on another FC HBA. The VIOS sends a LINK up when new mapping to another FC HBA is established.

Figure 3:
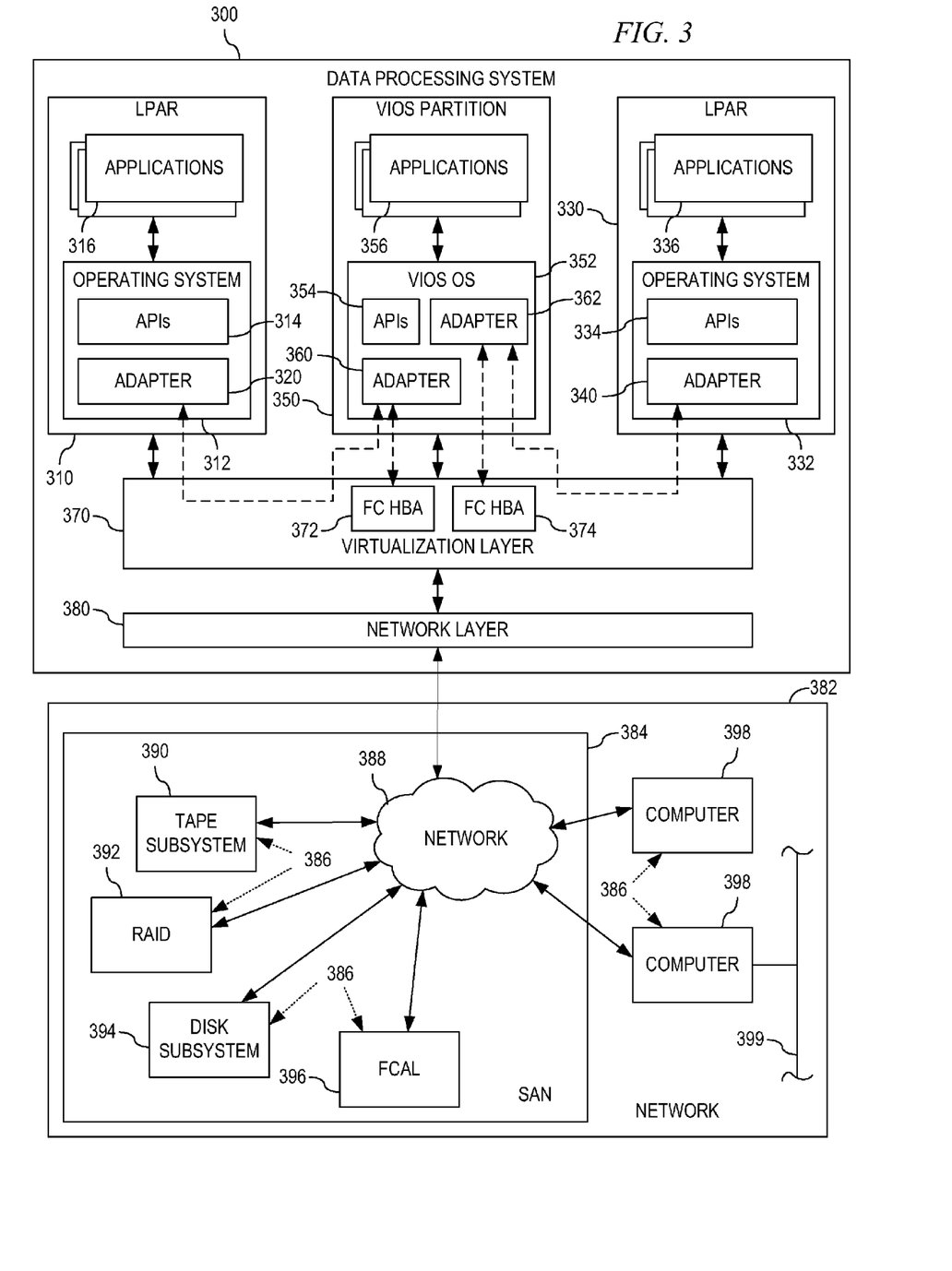
FIG. 3 depicts an exemplary block diagram illustrating a data processing system with a virtualized environment in accordance with an illustrative embodiment.

FIG. 3 depicts an exemplary block diagram illustrating a data processing system with a virtualized environment in accordance with an illustrative embodiment. Data processing system 300 has a plurality of logical partitions (LPARs) 310, 330, 350, which may also be referred to as clients or initiators. LPAR 310 has an instance of an operating system 312 with a set of application programming interfaces (APIs) 314 and one or more applications 316 running. LPAR 330 has operating system 332 with APIs 334 and one or more applications 336. LPAR 350 is a virtual input/output server (VIOS) partition and has VIOS operating system 352 with APIs 354 and one or more applications 356 running. LPAR 350 may be a VIOS partition by virtue of applications 356 including VIOS software. While data processing system 300 illustrates only LPARs 310 and 330, and VIOS partition 350, the illustrative embodiments are not limited to such. Rather, any number of LPARs may be utilized with the mechanisms of the illustrative embodiments without departing from the spirit and scope of the present invention.

LPARs 310 and 330 and VIOS partition 350 may communicate with one another through virtualization layer 370. Virtualization layer 370 is software that performs communications and resource management to allow multiple instances of operating systems 312 and 332 and VIOS operating system 352 to run on data processing system 300 at the same time. Virtualization layer 370 performs tasks such as processor time slice sharing, memory allocation, or the like. Virtualization layer 370 may be, for example, a hypervisor.

Applications 316 and 336 may include network applications that communicate with devices on Fibre Channel network 382. When communicating with Fibre Channel network 382, applications 316 and 336 make calls to APIs 314 and 334, and operating systems 312 and 332 that communicate through N_port identification virtualization (NPIV) adapters 320 and 340, respectively, to N_port identification virtualization (NPIV) server adapters 360 and 362, respectively, in VIOS partition 350 using a respectively assigned worldwide port name (WWPN). In the illustrative embodiments each of NPIV server adapters 360 and 362 form two relationships. NPIV server adapters 360 and 362 each form a respective first relationship to NPIV adapter 320 and NPIV adapter 340. In addition, NPIV server adapters 360 and 362 each form a second relationship with a port on Fibre Channel host bus adapters (FC HBAs) 372 or 374 in virtualization layer 370. Each port on FC HBAs 372 and 374 may serve many NPIV server adapters simultaneously. Current limitations of a single port on an FC HBA is limited to 64 NPIV server adapters. However, this is a limitation of the currently known FC HBAs and the illustrative embodiments are not limited such currently known limitations.

NPIV server adapters 360 and 362 provide virtual WWPNs that map directly to WWPNs of Fibre Channel host bus adapters (FC HBAs) 372 or 374 virtualized in virtualization layer 370. That is, virtualization layer 370 presents virtual FC HBAs 372 and 374 that map to physical FC HBAs using a plurality of worldwide port names. While data processing system 300 illustrates FC HBAs 372 and 374, the illustrative embodiments are not limited to such. Rather, any number of FC HBAs or other communication adapters may be utilized with the mechanisms of the illustrative embodiments without departing from the spirit and scope of the present invention. NPIV server adapter 360 then communicates or passes the call from application 316 and 336 through FC HBAs 372 or 374 virtualized in virtualization layer 370 and network layer 380 to network 382. Network layer 380 is software that performs tasks for network communication. Network layer 380 may perform tasks such as end-to-end packet delivery, quality of service maintenance, error control, and the like.

Network 382 may be a network that includes a storage area network (SAN) 384 that, in the depicted example, is a Fibre Channel compliant SAN. Fibre Channel is a scalable technology data transfer interface technology that maps several common transport protocols, including Internet Protocol (IP) and Small Computer System Interface (SCSI), allowing it to merge high-speed I/O and networking functionality in a single connectivity technology. Fibre Channel is a set of open standards defined by American National Standards Institute (ANSI) and International Organization for Standardization (ISO). Detailed information regarding the various Fibre Channel standards is available from ANSI Accredited Standards Committee (ASC) X3T11, which is primarily responsible for the Fibre Channel project. These standards are collectively referred to in this specification as the Fibre Channel standard or the Fibre Channel specification. Fibre Channel operates over both copper and fiber optic cabling at distances of up to 10 Kilometers and supports multiple inter-operable topologies including point-to-point, arbitrated-loop, and switching (and combinations thereof).

It should be appreciated that while the illustrative embodiments will be described in terms of using Fibre Channel and a Fibre Channel fabric, the illustrative embodiments are not limited to such. Rather, any interface technology, communication suite, or communication protocol may be utilized with the mechanisms of the illustrative embodiments without departing from the spirit and scope of the present invention. Fibre Channel is only used as an example and is not intended to state or imply any limitation with regard to the types of communication connections or protocols that may be used with the mechanisms of the illustrative embodiments.

The depicted embodiment of SAN 384 includes a set of nodes 386 that are interconnected through Fibre Channel fabric network 388. Nodes 386 of network 382 may include any of a variety of devices or systems including, data processing system 300, data processing systems 398 (computers), tape subsystems 390, RAID devices 392, disk subsystems 394, Fibre Channel arbitrated loops (FCAL) 396, or other suitable data storage and data processing devices. One or more of nodes 386 of network 382 may be connected to an external network denoted by reference numeral 399. External network 399 may be a local area network (LAN), a wide area network (WAN), or the like. For example, the external network 399 may be an Internet Protocol (IP) supported network, such as the Internet.

Figure 4A:
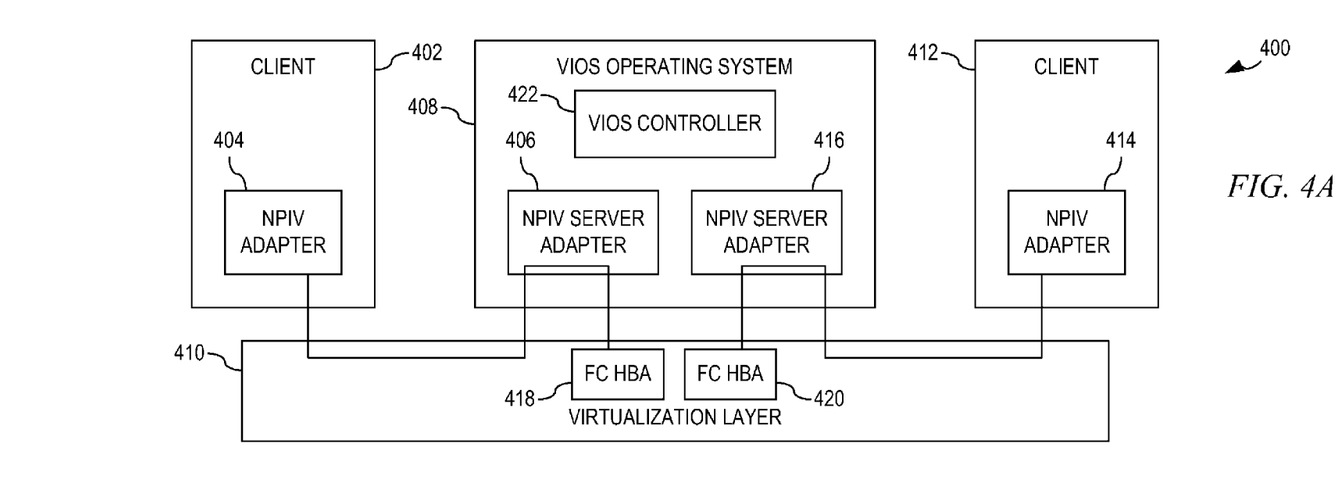
FIG. 4A depicts a simplified exemplary block diagram illustrating a data processing system, such as data processing system 300 of FIG. 3, with a virtualized environment in accordance with an illustrative embodiment.

FIG. 4A depicts a simplified exemplary block diagram illustrating a data processing system, such as data processing system 300 of FIG. 3, with a virtualized environment in accordance with an illustrative embodiment. In data processing system 400, client 402 uses N_port identification virtualization (NPIV) adapter 404 to connect to NPIV server adapter 406 in virtual input/output server (VIOS) 408 through virtualization layer 410. Likewise in data processing system 400, client 412 uses NPIV adapter 414 to connect to NPIV server adapter 416 in VIOS 408 through virtualization layer 410. NPIV server adapters 406 and 416 provide for logical portioning of ports on Fibre Channel host bus adapters (FC HBAs) 418 and 420, respectively, to connect clients 402 and 412 to a Fibre Channel (FC) fabric. By logically portioning the ports on FC HBAs 418 and 420, FC HBAs 418 and 420 are able to support multiple clients each with a unique N_Port ID.

VIOS 408 uses VIOS controller 422 to communicate with FC HBAs 418 and 420. When FC HBA 418 or 420 begins to experience errors indicating a pending failure, FC HBA 418 or 420 send the errors as fabric events to VIOS 408 through VIOS controller 422. VIOS controller 422 may use one or more predetermined error thresholds to determine if the received errors indicate that FC HBA 418 and/or 420 are beginning to fail. VIOS 408 may then use VIOS controller 422 to communicate appropriate fabric events received from FC HBAs 418 and/or 420 to the appropriate one(s) of clients 402 or 412. VIOS controller 422 may also queue the fabric events if communication with clients 402 and 412 is not possible, due to an outage, the client being offline, or the like. VIOS controller 422 provides a mapping of each NPIV adapter 404 or 414 to an assigned port on FC HBA 418 or 420. In addition, VIOS controller 422 stores information provided by FC HBAs 418 and 420 and/or virtualization layer 410 that identifies the connectivity provided by each port of FC HBAs 418 and 420 to a set of targets. As targets are added to a particular port on a FC HBA, then the FC HBA and/or the virtualization layer in which the FC HBA resides provides updates to VIOS controller 422. Thus, VIOS controller 422 also provides for mapping NPIV adapters 404 or 414 from one FC HBA port to another FC HBA port in the event of required attention, such as a pending failure in FC HBA 418 or 420, maintenance of FC HBA 418 or 420, workload balancing between FC HBAs 418 and 420, or the like.

Figure 4B:
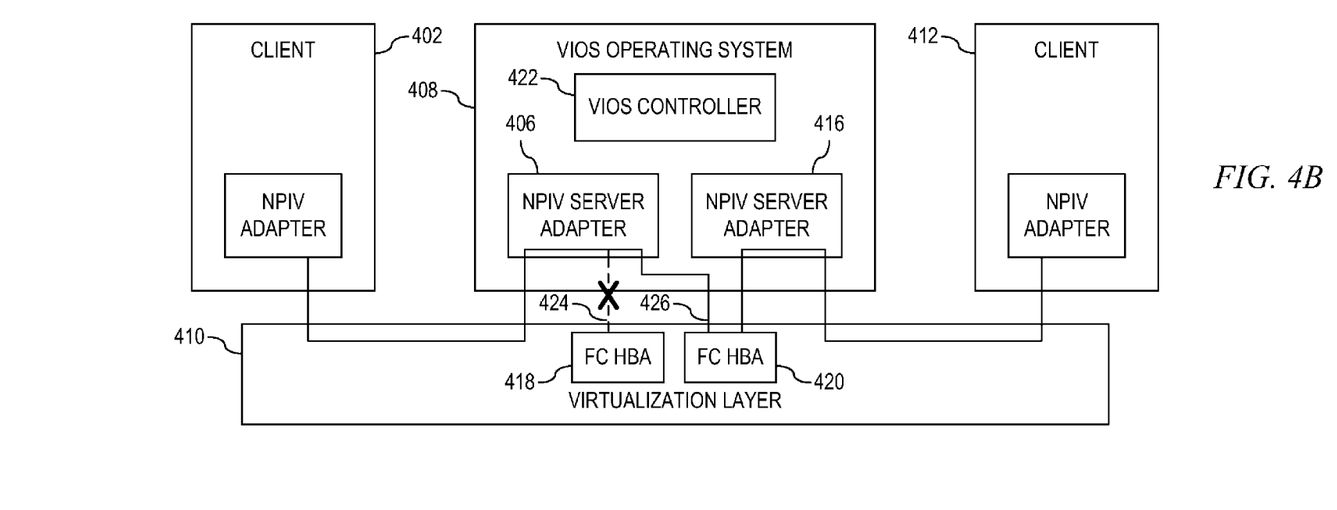
FIG. 4B illustrates an exemplary failure or maintenance of a FC HBA in accordance with an illustrative embodiment.

FIG. 4B illustrates an exemplary failure or maintenance of a FC HBA in accordance with an illustrative embodiment. In the event of a pending failure but not complete failure or maintenance of FC HBA 418, for example, VIOS controller 422 calls NPIV server adapter 406. The call indicates that NPIV server adapter 406 is to move client 402 from its assigned port on FC HBA 418 to an available port on FC HBA 420. NPIV server adapter 406 then sends an event signal, such as a LINK down signal, to client 402 indicating that connectivity has temporarily been lost. NPIV server adapter 406 then sends a command to FC HBA 418 to break existing connection 424 for client 402. Upon receiving the command, FC HBA 418 breaks the requested connection and returns an acknowledgement to NPIV server adapter 406. In this example, NPIV server adapter 406 then sends a connection command to FC HBA 420 in order to establish new connection 426 for client 402 to FC HBA 420. Upon receiving the command, FC HBA 420 establishes the requested connection and returns an acknowledgement to NPIV server adapter 406. NPIV server adapter 406 then sends an event signal, such as a LINK up signal, to client 402 that connectivity has been reestablished. With connectivity reestablished, client 402 is then able to perform communication with the FC fabric through FC HBA 420 without a substantial loss of service that would normally be incurred if FC HBA 418 had completely failed.

Figure 4C:
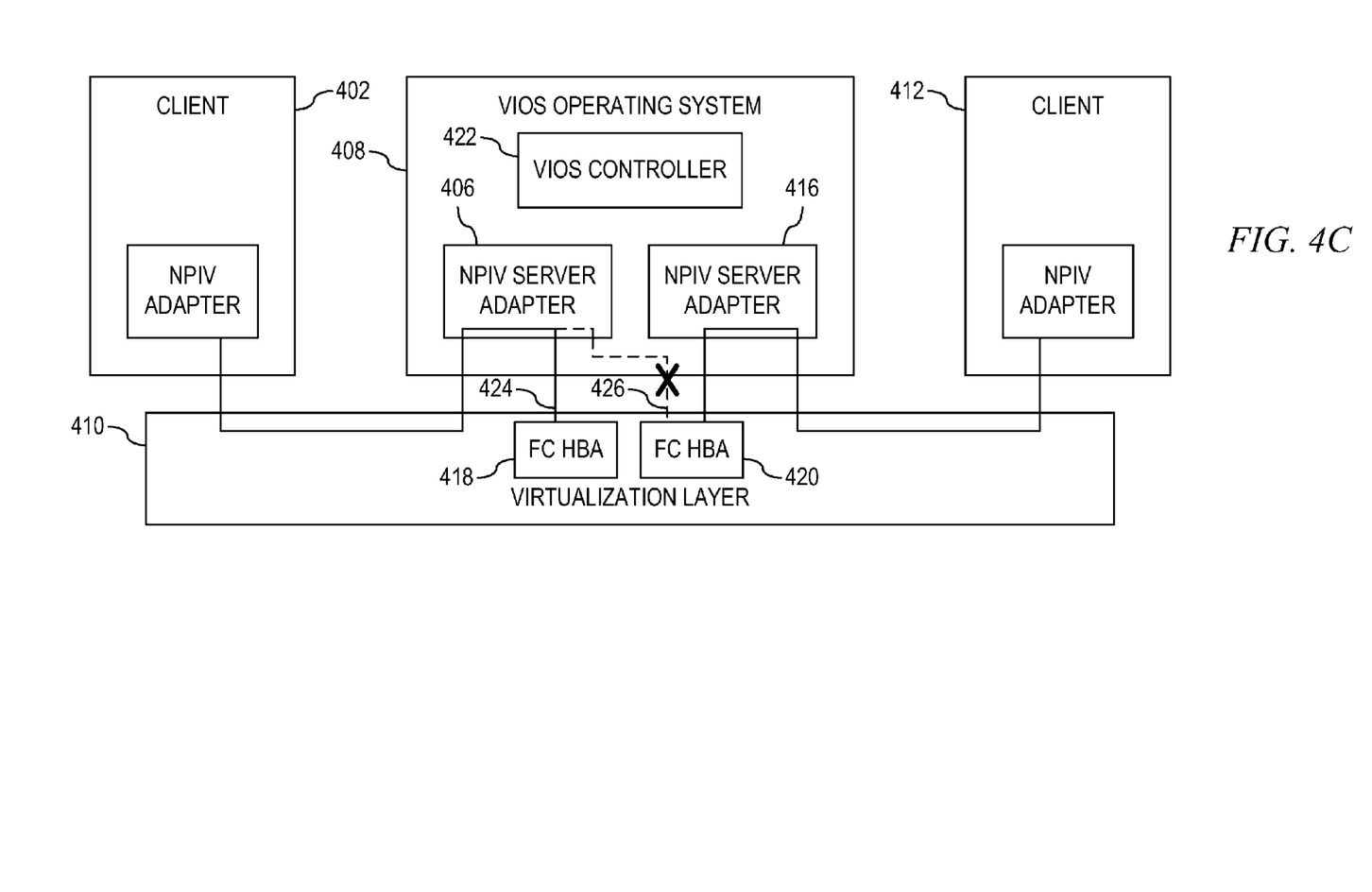
FIG. 4C illustrates an exemplary recovery from a failure or successful maintenance of a FC HBA in accordance with an illustrative embodiment.

FIG. 4C illustrates an exemplary recovery from a failure or successful maintenance of a FC HBA in accordance with an illustrative embodiment. In the event of a recovery from a failure of successful maintenance of FC HBA 418, for example, VIOS controller 422 receives a recovery message or initialization message from FC HBA 418. In response to a recovery message or initialization message from FC HBA 418, VIOS controller 422 calls NPIV server adapter 406. The call indicates that NPIV server adapter 406 is to move client 402 from its assigned port on FC HBA 420 to an available port on FC HBA 418. NPIV server adapter 406 then sends an event signal to client 402 indicating that connectivity has temporarily been lost. NPIV server adapter 406 then sends a command to FC HBA 420 to break connection 426 for client 402. Upon receiving the command, FC HBA 420 breaks the requested connection and returns an acknowledgement to NPIV server adapter 406. In this example, NPIV server adapter 406 then sends a connection command to FC HBA 418 in order to establish connection 424 for client 402 to FC HBA 418. Upon receiving the command, FC HBA 418 establishes the requested connection and returns an acknowledgement to NPIV server adapter 406. NPIV server adapter 406 then sends an event signal to client 402 that connectivity has been reestablished. With connectivity reestablished, client 402 is then able to perform communication with the FC fabric through FC HBA 418.

Figure 4D:
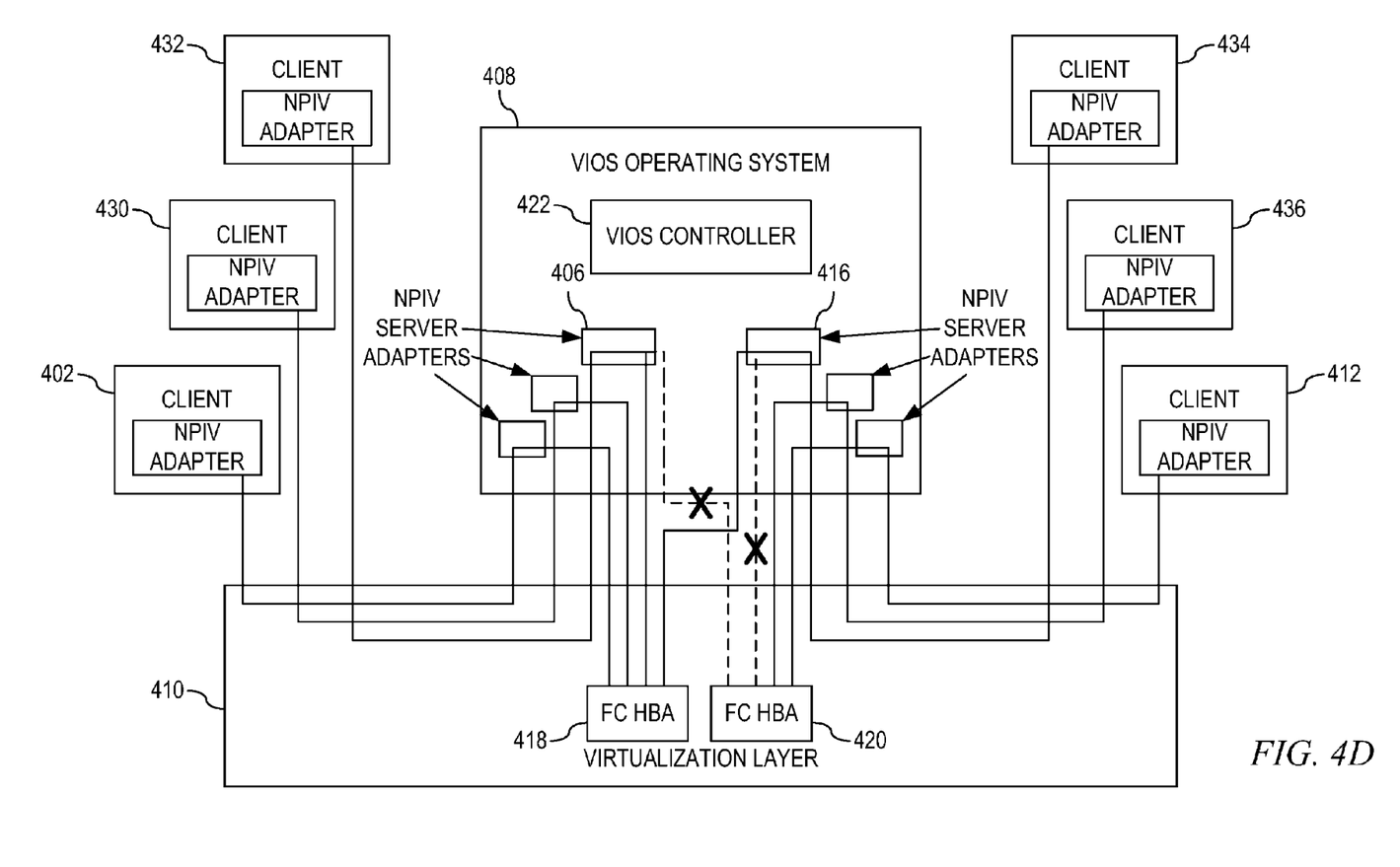
FIG. 4D illustrates an exemplary workload balancing between a set of Fibre Channel host bus adapters (FC HBAs) in accordance with an illustrative embodiment.

FIG. 4D illustrates an exemplary workload balancing between a set of Fibre Channel host bus adapters (FC HBAs) in accordance with an illustrative embodiment. VIOS controller 422 receives workload information from each of FC HBAs 418 and 420. Again, while the illustrative FIG. 4D illustrates only FC HBAs 418 and 420, the illustrative embodiments are not limited to such. Rather, any number of FC HBAs may be utilized with the mechanisms of the illustrative embodiments without departing from the spirit and scope of the present invention. In the event the workload information from FC HBAs 418 and 420 indicates the workload balancing needs to be performed based on a predetermined workload balance threshold, then VIOS controller initiates workload balancing between FC HBA 418 and 420. In this example, VIOS controller 422 identifies that FC HBA 420 supporting clients 412, 432, 434, and 436 is performing 50 percent more work than that being performed by FC HBA 418 supporting clients 402 and 430. VIOS controller 422 then identifies which of clients 412, 432, 434, or 436 connected to FC HBA 420 that may be moved from FC HBA 420 to FC HBA 418. Based on the workload of each of the clients communicating with FC HBA 420, VIOS controller 422 may identify 1 to N clients that would substantially balance the workload between FC HBA 420 and FC HBA 418.

Once VIOS controller 422 identifies the set of clients, in this example, clients 432 and 434 to move from FC HBA 420 to FC HBA 418, then VIOS controller 422 calls NPIV server adapter 406 and NPIV server adapter 416. The call to NPIV server adapter 406 indicates that NPIV server adapter 406 is to move client 432 from its assigned port on FC HBA 420 to an available port on FC HBA 418. NPIV server adapter 406 then sends an event signal to client 432 indicating that connectivity has temporarily been lost. NPIV server adapter 406 then sends a command to FC HBA 420 to break the connection for client 432. Upon receiving the command, FC HBA 420 breaks the requested connection and returns an acknowledgement to NPIV server adapter 406. In this example, NPIV server adapter 406 then sends a connection command to FC HBA 418 in order to establish connectivity for client 432 to FC HBA 418. Upon receiving the command, FC HBA 418 establishes the requested connection and returns an acknowledgement to NPIV server adapter 406. NPIV server adapter 406 then sends an event signal to client 432 that connectivity has been reestablished. With connectivity reestablished, client 432 is then able to perform communication with the FC fabric through FC HBA 418.

The call to NPIV server adapter 416 indicates that NPIV server adapter 416 is to move client 434 from its assigned port on FC HBA 420 to an available port on FC HBA 418. NPIV server adapter 416 sends an event signal to client 434 indicating that connectivity has temporarily been lost. NPIV server adapter 416 then sends a command to FC HBA 420 to break the connection for client 434. Upon receiving the command, FC HBA 420 breaks the requested connection and returns an acknowledgement to NPIV server adapter 416. In this example, NPIV server adapter 416 then sends a connection command to FC HBA 418 in order to establish connectivity for client 434 to FC HBA 418. Upon receiving the command, FC HBA 418 establishes the requested connection and returns an acknowledgement to NPIV server adapter 416. NPIV server adapter 416 then sends an event signal to client 434 that connectivity has been reestablished. With connectivity reestablished, client 434 is then able to perform communication with the FC fabric through FC HBA 418.

Thus, the illustrative embodiments provide a mechanism for using N_port identification virtualization (NPIV) to solve the same problems with minimal hardware and/or administrator involvement. NPIV allows multiple clients to use a Fibre Channel port where each client is assigned a unique worldwide port name (WWPN). The illustrative embodiments use the VIOS to map a client NPIV adapter from an assigned FC HBA port to another FC HBA port in the event of a FC HBA failure, maintenance of an FC HBA, workload balancing between two or more FC HBAs, or the like.

Figure 5:
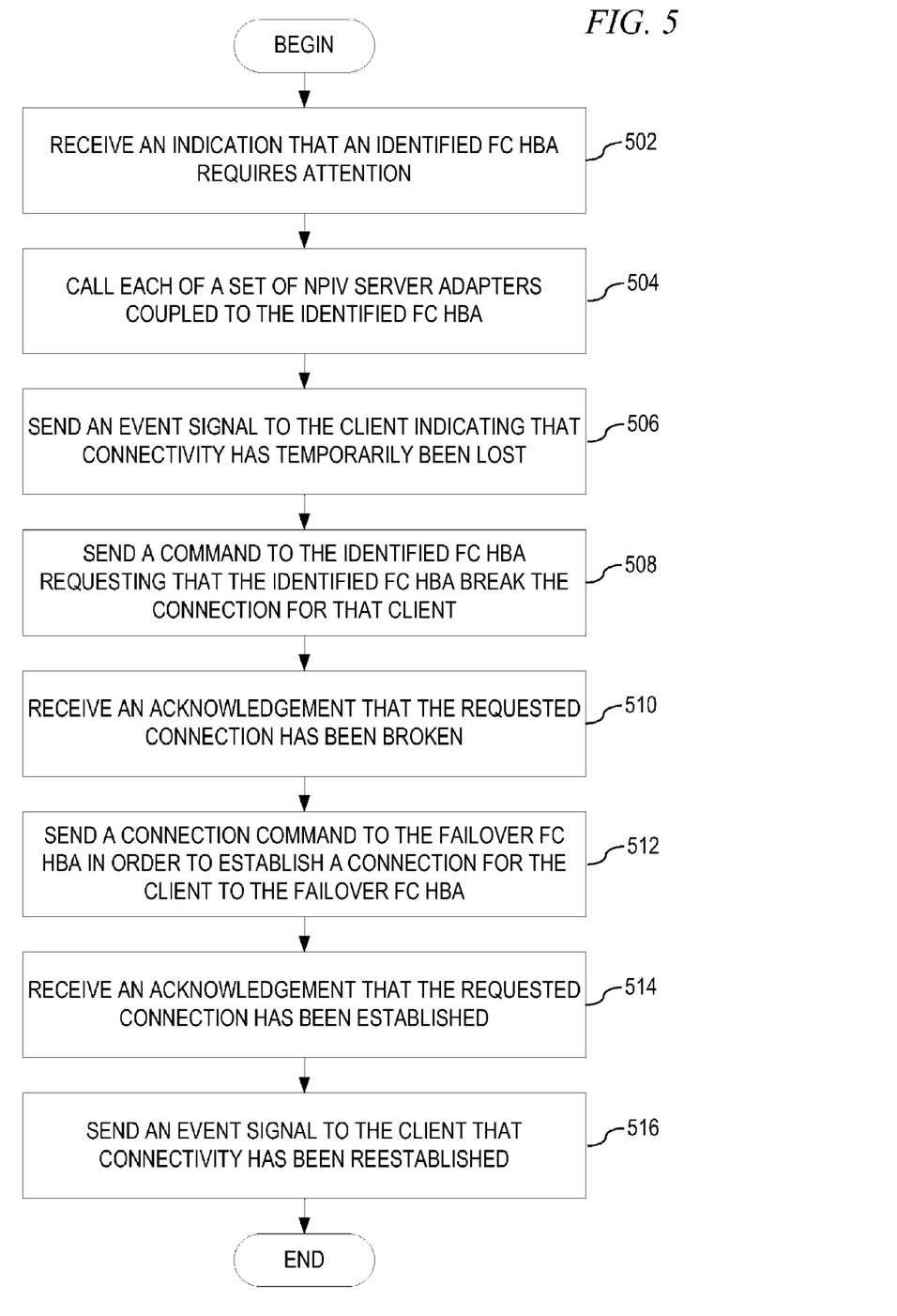
FIG. 5 depicts an exemplary flowchart of the operation performed by a virtual input/output server (VIOS) operating system of a data processing system during the failure or maintenance of a Fibre Channel host bus adapter (FC HBA) in accordance with an illustrative embodiment.

FIG. 5 depicts an exemplary flowchart of the operation performed by a virtual input/output server (VIOS) operating system of a data processing system during the failure or maintenance of a Fibre Channel host bus adapter (FC HBA) in accordance with an illustrative embodiment. As the operation begins, a VIOS controller in the VIOS data processing system receives an indication that an identified FC HBA requires attention (step 502). In response to such an indication, the VIOS controller system calls each of a set of NPIV server adapters coupled to the identified FC HBA (step 504). Each call indicates to the respective NPIV server adapter to move one or more clients from their assigned port on the identified FC HBA to an available port on a failover FC HBA. For each client served by each NPIV server adapter, the NPIV server adapter sends an event signal to the client indicating that connectivity has temporarily been lost (step 506). The NPIV server adapter then sends a command to the identified FC HBA requesting that the identified FC HBA break the connection for that client (step 508). Upon receiving the command, the identified FC HBA breaks the requested connection and returns an acknowledgement to the NPIV server adapter (step 510). The NPIV server adapter then sends a connection command to the failover FC HBA in order to establish a connection for the client to the failover FC HBA (step 512). Upon receiving the command, the failover FC HBA establishes the requested connection and returns an acknowledgement to the NPIV server adapter (step 514). The NPIV server adapter then sends an event signal to the client that connectivity has been reestablished (step 516), with the operating ending thereafter. With connectivity reestablished, the client is then able to perform communication with the FC fabric through the failover FC HBA.

Figure 6:
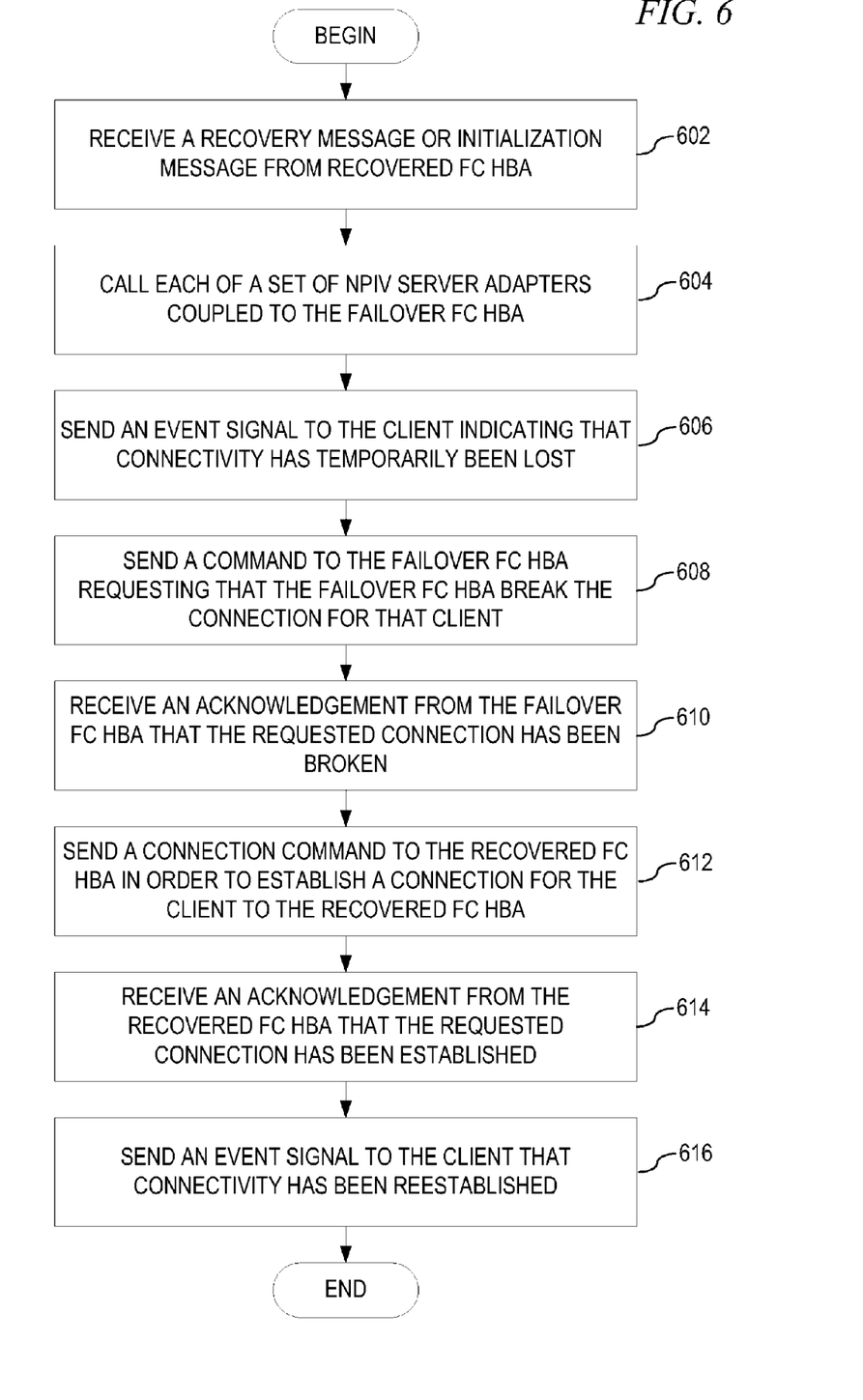
FIG. 6 depicts an exemplary flowchart of the operation performed by a virtual input/output server (VIOS) operating system of a data processing system during the recovery from a failure or maintenance of a Fibre Channel host bus adapter (FC HBA) in accordance with an illustrative embodiment.

FIG. 6 depicts an exemplary flowchart of the operation performed by a virtual input/output server (VIOS) operating system of a data processing system during the recovery from a failure or maintenance of a Fibre Channel host bus adapter (FC HBA) in accordance with an illustrative embodiment. As the operation begins, in the event of a recovery from a failure of successful maintenance of a recovered FC HBA, the VIOS controller in the VIOS data processing system receives a recovery message or initialization message from the recovered FC HBA (step 602). In response to a recovery message or initialization message from the recovered FC HBA, the VIOS controller calls each of a set of NPIV server adapters coupled to the failover FC HBA (step 604). The call indicates that the NPIV server adapter is to move the client from its assigned port on failover FC HBA to an available port on the recovered FC HBA. The NPIV server adapter then sends an event signal to the client indicating that connectivity has temporarily been lost (step 606). The NPIV server adapter then sends a command to the failover FC HBA to break the connection for the client (step 608). Upon receiving the command, the failover FC HBA breaks the requested connection and returns an acknowledgement to the NPIV server adapter (step 610). The NPIV server adapter then sends a connection command to the recovered FC HBA in order to establish a connection for the client to the recovered FC HBA (step 612). Upon receiving the command, the recovered FC HBA establishes the requested connection and returns an acknowledgement to the NPIV server adapter (step 614). The NPIV server adapter then sends an event signal to the client that connectivity has been reestablished (step 616), with the operating ending thereafter. With connectivity reestablished, the client is then able to perform communication with the FC fabric through the recovered FC HBA.

Figure 7:
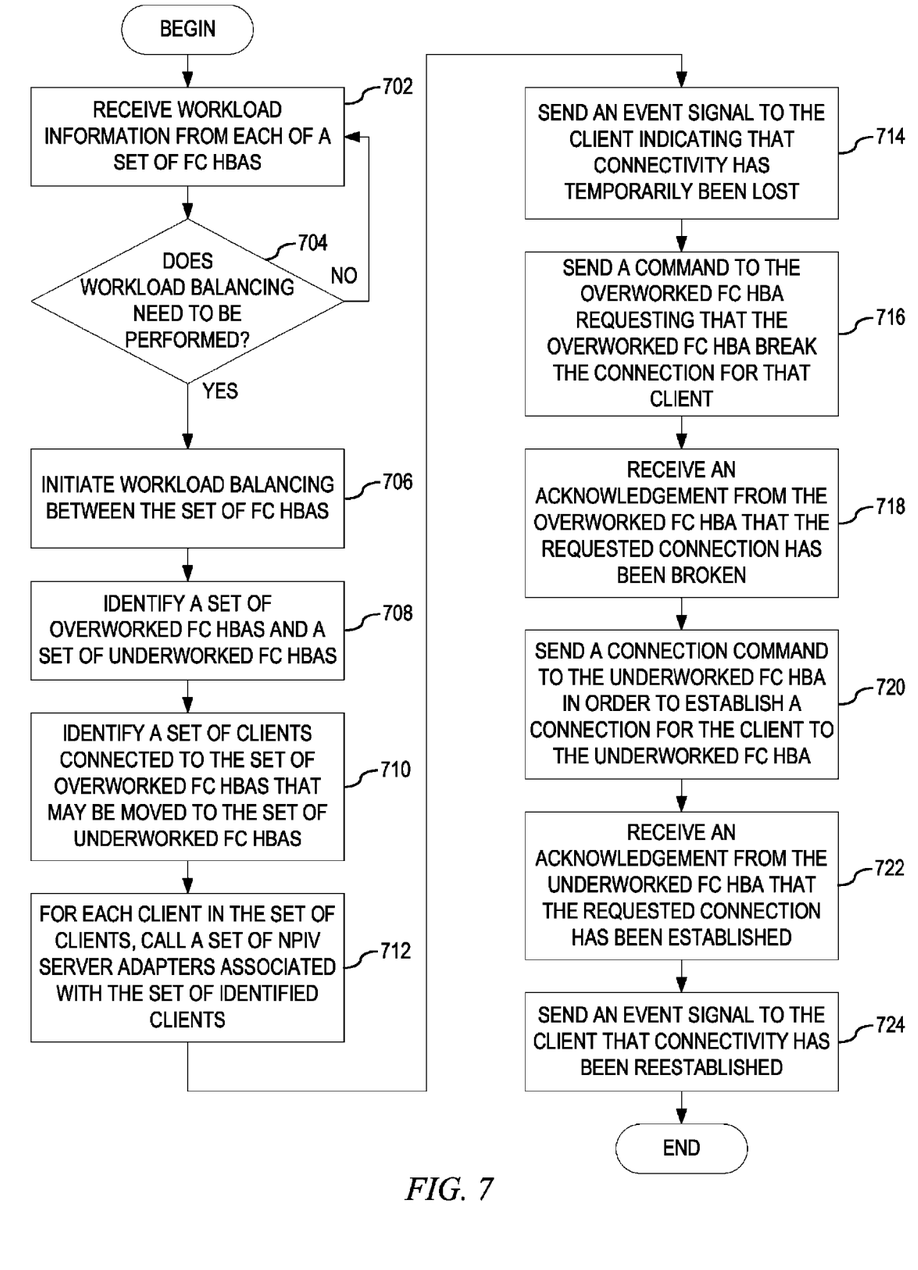
FIG. 7 depicts an exemplary flowchart of the operation performed by a virtual input/output server (VIOS) operating system of a data processing system for workload balancing between a set of Fibre Channel host bus adapters (FC HBAs) in accordance with an illustrative embodiment.

FIG. 7 depicts an exemplary flowchart of the operation performed by a virtual input/output server (VIOS) operating system of a data processing system for workload balancing between a set of Fibre Channel host bus adapters (FC HBAs) in accordance with an illustrative embodiment. As the operation begins, a VIOS controller in the VIOS data processing system receives workload information from each of a set of FC HBAs (step 702). The VIOS controller determines if the workload information indicates that a workload balance needs to be performed based on a predetermined workload balance threshold (step 704). If at step 704 the VIOS controller determines that a workload balance does not need to be performed, then the operation returns to step 702. If at step 704 the VIOS controller determines that a workload balance needs to be performed, then the VIOS controller initiates workload balancing between the set of FC HBAs (step 706). In this example, the VIOS controller identifies one or more of the set of FC HBAs that are performing more than the predetermined workload balance threshold and one or more of the set of FC HBAs that are performing less than the predetermined workload balance threshold, referred to herewith as the set of overworked FC HBAs and the set of underworked FC HBAs, respectively (step 708). The VIOS controller then identifies a set of clients connected to the set of overworked FC HBAs that may be moved from the set of overworked FC HBAs to the set of underworked FC HBAs based on the workload performed by the one or more clients (step 710).

Once the VIOS controller identifies the set of clients, then the VIOS controller calls a set of NPIV server adapters associated with the set of clients (step 712). The call(s) to the set of NPIV server adapters indicate that the set of NPIV server adapters are to move the set of clients from their assigned port on the set of overworked FC HBAs to an available port on the set of underworked FC HBAs. For each client in the set of clients, the associated NPIV server adapter in the set of NPIV server adapters sends an event signal to the client indicating that connectivity has temporarily been lost (step 714). The associated NPIV server adapter then sends a command to the associated overworked FC HBA in the set of overworked FC HBAs to break the connection for that client (step 716). Upon receiving the command, the associated overworked FC HBA breaks the requested connection and returns an acknowledgement to the NPIV server adapter (step 718). The NPIV server adapter then sends a connection command to an underworked FC HBA in the set of underworked FC HBAs in order to establish connectivity for the client to the underworked FC HBA (step 720). Upon receiving the command, the underworked FC HBA establishes the requested connection and returns an acknowledgement to the NPIV server adapter (step 722). The NPIV server adapter then sends an event signal to the client that connectivity has been reestablished (step 724), with the operating ending thereafter. With connectivity reestablished, the client is then able to perform communication with the FC fabric through the underworked FC HBA.

Thus, the illustrative embodiments provide a mechanism for using N_port identification virtualization (NPIV) to solve the same problems with minimal hardware and/or SAN administration. The illustrative embodiments use a Virtual I/O Server (VIOS) that couples to a plurality of Fibre Channel host bus adapters (FC HBAs) and presents virtual FC HBAs with their own world wide port name by using a virtualization layer. By forwarding appropriate fabric events received virtual FC HBA ports to each client through their virtual NPIV adapter and/or queuing Fibre Channel transactions for each client or initiator, the VIOS provides for multiple initiators to share one FC HBA so that two FC HBAs may provide redundancy to more then one initiator, thus saving hardware. Therefore, the illustrative embodiments break dependency between the FC HBA world wide port name and the initiators access to SCSI targets since the world wide port names are attributes of a VIOS controlled NPIV adapter rather then the physical FC HBA. The VIOS provides for sending each effected client a notification of LINK down when the FC HBA to which the client is connected, has lost, or is losing connectivity to the Fibre Channel fabric or when an expected maintenance event occurs, which requires remapping the virtual port of the NPIV adapter to a new port on another FC HBA. The VIOS sends a LINK up when new mapping to another FC HBA is established.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for altering access to a network, the method comprising:

receiving, by a virtual I/O server controller in a virtual I/O server operating system of the data processing system, an indication that an identified communications adapter requires attention;

issuing a set of calls, by the virtual I/O server controller, to a set of N_port identification virtualization server adapters coupled to the identified communications adapter, wherein each of the set of calls indicates to each of the set of N_port identification virtualization server adapters a request to move a set of clients from their assigned port on the identified communications adapter to an available port on a failover communications adapter; and moving, by the set of N_port identification virtualization server adapters, the set of clients from the identified communications adapter to the failover communications adapter, wherein an associated N_port identification virtualization server adapter in the set of N_port identification virtualization server adapters moves each client in the set of clients by:
  sending a first event signal to the client indicating that connectivity has temporarily been lost;
  sending a command to the identified communications adapter requesting that the identified communications adapter break an existing connection for the client;
  receiving an acknowledgement that the identified communications adapter has broken the existing connection;
  sending a connection command to the failover communications adapter requesting a new connection for the client;
  receiving an acknowledgement that the failover communications adapter has established the new connection; and
  sending a second event signal to the client indicating that connectivity has been reestablished.

2. The method of claim 1, wherein the attention is at least one of a pending failure of the communications adapter, maintenance of the communications adapter, or workload balancing between the communications adapter and at least one other communications adapter.

3. The method of claim 1, wherein the set of clients experience no substantial loss of service due to moving the set of clients from the identified communications adapter to the failover communications adapter prior to the identified communications adapter completely failing.

4. The method of claim 1, wherein the network is a Fibre Channel fabric network.

5. The method of claim 1, wherein the communications adapter is a Fibre Channel host bus adapter.

6. The method of claim 1, further comprising:
  receiving, by the virtual I/O server controller, an indication that an identified communications adapter has recovered;
  issuing a subsequent set of calls, by the virtual I/O server controller, to the set of N_port identification virtualization server adapters, wherein each of the subsequent set of calls indicates to each of the set of N_port identification virtualization server adapters a request to move a set of clients from their assigned port on the failover communications adapter to an available port on the identified communications adapter; and
  moving, by the set of N_port identification virtualization server adapters, the set of clients from the failover communications adapter to the identified communications adapter.

7. The method of claim 1, wherein the indication that the identified communications adapter requires attention identifies that the identified communications adapter requires workload balancing and wherein balancing the workload of the communications adapter comprises:
  determining, by the virtual I/O server controller, one or more additional communications adapters with which to perform workload balancing with the identified communications adapter;
  identifying, by the virtual I/O server controller, a subset of the set of clients connected to the identified communications adapter to move from the identified communications adapter to the one or more additional communications adapters;
  issuing a set of workload balancing calls, by the virtual I/O server controller, to a set of N_port identification virtualization server adapters coupled to the identified communications adapter and the one or more additional communications adapters, wherein the set of workload balancing calls indicates to the set of N_port identification virtualization server adapters a request to move the subset of the set of clients from their assigned port on the identified communications adapter to the one or more additional communications adapters; and
  moving, by the set of N_port identification virtualization server adapters, the subset of the set of clients from the identified communications adapter to the one or more additional communications adapters.

8. A computer program product comprising a non-transitory computer readable storage medium having a computer readable program recorded thereon, wherein the computer readable program, when executed on a computing device, causes the computing device to:
  receive an indication that an identified communications adapter requires attention;
  issue a set of calls to a set of N_port identification virtualization server adapters coupled to the identified communications adapter, wherein each of the set of calls indicates to each of the set of N_port identification virtualization server adapters a request to move a set of clients from their assigned port on the identified communications adapter to an available port on a failover communications adapter; and
  move the set of clients from the identified communications adapter to the failover communications adapter, wherein the computer readable program to move each client in the set of clients from the identified communications adapter to the failover communications adapter further causes the computing device to:
    send a first event signal to the client indicating that connectivity has temporarily been lost;
    send a command to the identified communications adapter requesting that the identified communications adapter break an existing connection for the client;
    receive an acknowledgement that the identified communications adapter has broken the existing connection;
    send a connection command to the failover communications adapter requesting a new connection for the client;
    receive an acknowledgement that the failover communications adapter has established the new connection; and
    send a second event signal to the client indicating that connectivity has been reestablished.

9. The computer program product of claim 8, wherein the attention is at least one of a pending failure of the communications adapter, maintenance of the communications adapter, or workload balancing between the communications adapter and at least one other communications adapter.

10. The computer program product of claim 8, wherein the set of clients experience no substantial loss of service due to moving the set of clients from the identified communications adapter to the failover communications adapter prior to the identified communications adapter completely failing.

11. The computer program product of claim 8, wherein the computer readable program further causes the computing device to:
  receive an indication that an identified communications adapter has recovered;
  issue a subsequent set of calls to the set of N_port identification virtualization server adapters, wherein each of the subsequent set of calls indicates to each of the set of N_port identification virtualization server adapters a request to move a set of clients from their assigned port on the failover communications adapter to an available port on the identified communications adapter; and move the set of clients from the failover communications adapter to the identified communications adapter.

12. The computer program product of claim 8, wherein the indication that the identified communications adapter requires attention identifies that the identified communications adapter requires workload balancing and wherein the computer readable program to balance the workload of the communications adapter further causes the computing device to:

determine one or more additional communications adapters with which to perform workload balancing with the identified communications adapter;

identify a subset of the set of clients connected to the identified communications adapter to move from the identified communications adapter to the one or more additional communications adapters;

issue a set of workload balancing calls to a set of N_port identification virtualization server adapters coupled to the identified communications adapter and the one or more additional communications adapters, wherein the set of workload balancing calls indicates to the set of N_port identification virtualization server adapters a request to move the subset of the set of clients from their assigned port on the identified communications adapter to the one or more additional communications adapters; and move the subset of the set of clients from the identified communications adapter to the one or more additional communications adapters.

13. An apparatus, comprising:

a processor; and a memory coupled to the processor, wherein the memory comprises instructions which, when executed by the processor, cause the processor to:

receive an indication that an identified communications adapter requires attention;

issue a set of calls to a set of N_port identification virtualization server adapters coupled to the identified communications adapter, wherein each of the set of calls indicates to each of the set of N_port identification virtualization server adapters a request to move a set of clients from their assigned port on the identified communications adapter to an available port on a failover communications adapter; and move the set of clients from the identified communications adapter to the failover communications adapter, wherein the instructions to move each client in the set of clients from the identified communications adapter to the failover communications adapter further cause the processor to:

send a first event signal to the client indicating that connectivity has temporarily been lost;

send a command to the identified communications adapter requesting that the identified communications adapter break an existing connection for the client;

receive an acknowledgement that the identified communications adapter has broken the existing connection;

send a connection command to the failover communications adapter requesting a new connection for the client;

receive an acknowledgement that the failover communications adapter has established the new connection; and send a second event signal to the client indicating that connectivity has been reestablished.

14. The apparatus of claim 13, wherein the attention is at least one of a pending failure of the communications adapter, maintenance of the communications adapter, or workload balancing between the communications adapter and at least one other communications adapter.

15. The apparatus of claim 13, wherein the set of clients experience no substantial loss of service due to moving the set of clients from the identified communications adapter to the failover communications adapter prior to the identified communications adapter completely failing.

16. The apparatus of claim 13, wherein the instructions further cause the processor to:

receive an indication that an identified communications adapter has recovered;

issue a subsequent set of calls to the set of N_port identification virtualization server adapters, wherein each of the subsequent set of calls indicates to each of the set of N_port identification virtualization server adapters a request to move a set of clients from their assigned port on the failover communications adapter to an available port on the identified communications adapter; and move the set of clients from the failover communications adapter to the identified communications adapter.

17. The apparatus of claim 13, wherein the indication that the identified communications adapter requires attention identifies that the identified communications adapter requires workload balancing and wherein the instructions to balance the workload of the communications adapter further cause the processor to:

determine one or more additional communications adapters with which to perform workload balancing with the identified communications adapter;

identify a subset of the set of clients connected to the identified communications adapter to move from the identified communications adapter to the one or more additional communications adapters;

issue a set of workload balancing calls to a set of N_port identification virtualization server adapters coupled to the identified communications adapter and the one or more additional communications adapters, wherein the set of workload balancing calls indicates to the set of N_port identification virtualization server adapters a request to move the subset of the set of clients from their assigned port on the identified communications adapter to the one or more additional communications adapters; and move the subset of the set of clients from the identified communications adapter to the one or more additional communications adapters.

* * * * *